United States Patent Office 3,515,411
Patented June 2, 1970

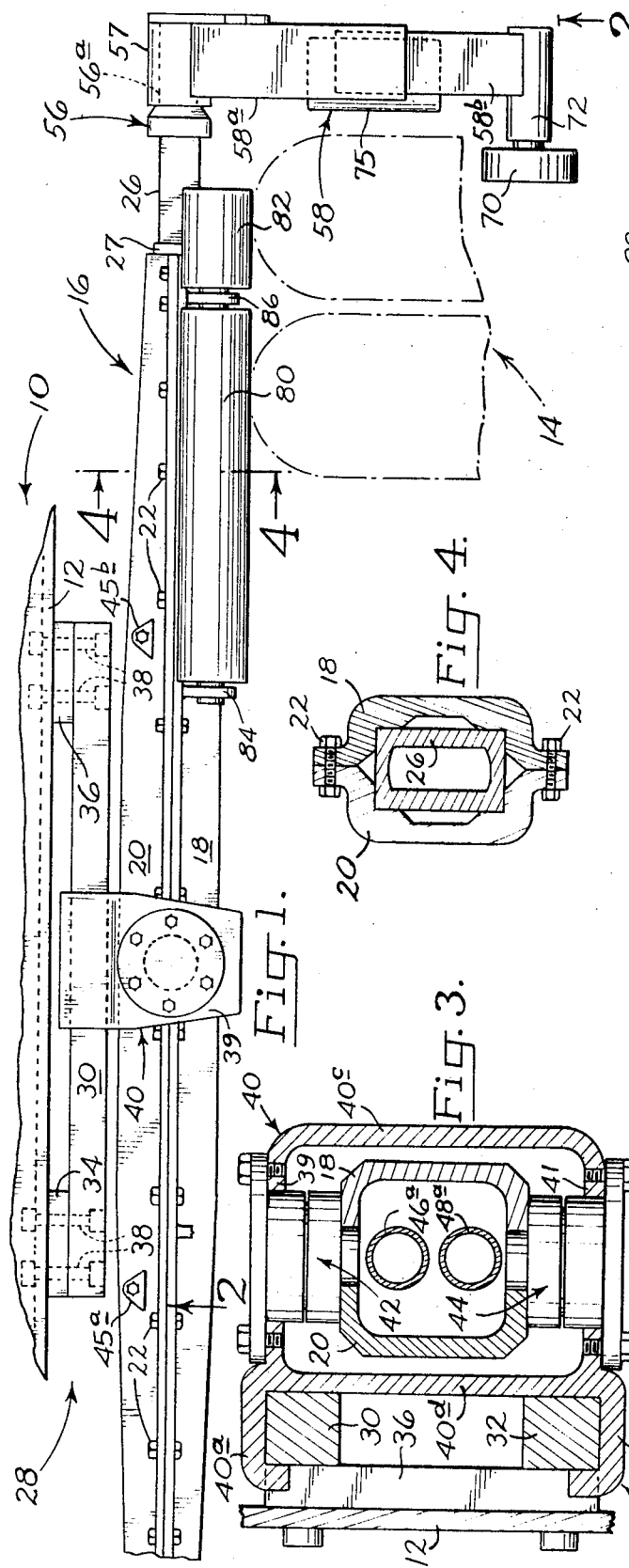

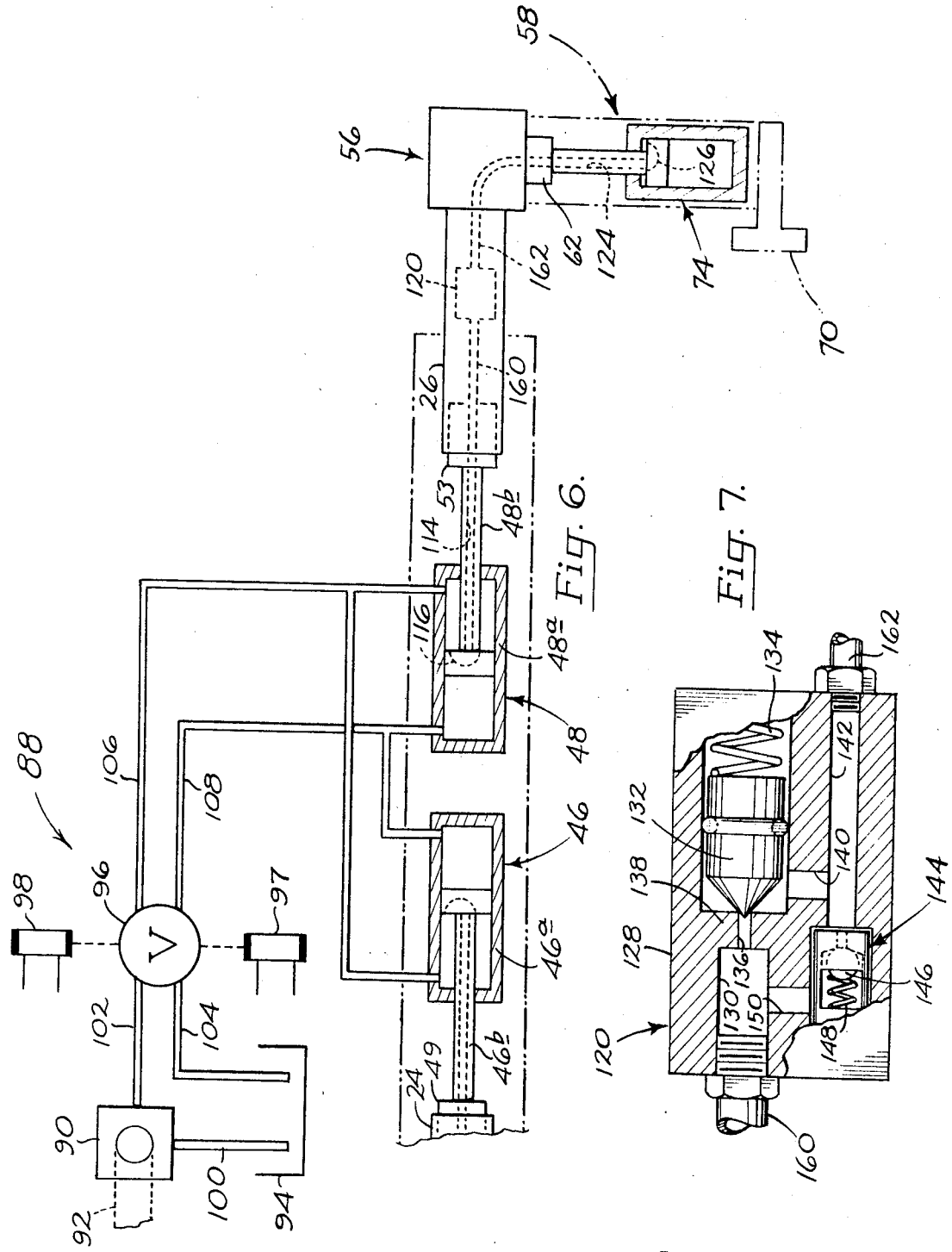

3,515,411
MECHANISM FOR COUPLING A VEHICLE TO A
UNIT LEADING THE VEHICLE
Jack D. Layton, 4725 Turner Road,
Salem, Oreg. 97302
Filed Dec. 21, 1967, Ser. No. 692,551
Int. Cl. B60d 3/00
U.S. Cl. 280—460                                9 Claims

ABSTRACT OF THE DISCLOSURE

Mechanism for coupling a vehicle to a unit leading the vehicle including elongated, horizontal guide structure fixedly joined to the front of the frame of the vehicle and extending transversely of the vehicle, a movable bracket mounted on the guide structure for movement therealong, an elongated beam assembly disposed in front of and substantially paralleling the guide structure, and pivot means pivotally joining a midregion of the beam assembly and bracket accommodating pivoting of the beam assembly relative to the bracket about an upright axis. A pair of opposed coupling arms are mounted on the beam assembly which attach to the unit leading the vehicle by engaging rear wheels in such unit. The coupling arms are contractible by remotely-controlled power-operated means located in such arms to bring the vehicle and the unit leading the vehicle snugly together.

---

This invention relates to apparatus for coupling a vehicle to a unit leading the vehicle. For the purpose of illustratin only, and not with any intention to limit other uses of the invention, a preferred embodiment is described with reference to apparatus or mechanism for coupling together two vehicles such as a paver and a dump truck.

In a typical road paving operation, a paver moves over the ground spreading aggregate from its hopper. Such aggregate is received from a dump truck detachably coupled to and traveling in front of the paver. When a truck has discharged its full load of aggregate, the truck is uncoupled from the paver, and a different dump truck is then connected in its place.

For such an operation to proceed smoothly, there are several factors which must be considered. To begin with, the mechanism for coupling the vehicles should require minimal manual adjustment during connecting and disconnecting operations, and should be capable of performing such operations rapidly. In addition, such mechanism should be sized to permit proper relative positioning of a truck and paver with the two attached, whereby, without requiring special chute extensions, the dump body in the truck can deposit aggregate directly into the paver's hopper. Also, the apparatus should be capable of producing a secure connection between a truck and paver, yet should permit a certain amount of relative movement between the two to accommodate turning of the equipment, and travel over uneven ground.

A further consideration is that the apparatus should be sufficiently rugged to withstand the bumps and jolts normally expected in a paving operation carried on by two vehicles coupled together. Excessive mass should also be avoided, as such upsets the balance of the paver.

Therefore, a general object of the present invention is to provide novel mechanism for coupling a vehicle to a unit leading the vehicle which takes the above-mentioned considerations into account in a practical and satisfactory manner.

More particularly, an object of the invention is to provide such mechanism which is capable of operating relatively quickly, and with minimum manual adjustment required during coupling and uncoupling operations.

A further object is to provide such apparatus which produces a secure connection between a pair of vehicles, inhibiting separation of the vehicles, yet permitting some relative pivoting and vertical and lateral shifting to accommodate turning and travel over uneven ground.

Another object is to provide such apparatus which is rugged, yet compact and sized to permit proper spacing of a pair of connected vehicles, such as a dump truck and a paver. The apparatus also may have relatively light mass.

Thus, a preferred embodiment of the invention features an elongated, horizontal beam assembly extending transversely of the forward end of a vehicle, supporting a pair of opposed, laterally-spaced, coupling arms. A bracket with legs straddling the midregion of the beam assembly is connected by bearings to upper-lower surfaces of the beam assembly. The bearings enable the beam assembly to swing about an upright axis. Guide structure comprising vertically-spaced bars joined to the frame of the vehicle supports the bracket for movement laterally of the vehicle. The coupling arms are used to couple the vehicle to a unit leading the vehicle.

With such construction, where the bearing pivotally mount the beam assembly on a slidable bracket, a relatively compact organization results, which requires only a small amount of space in the region forwardly of the vehicle's frame. Thus, and when used with a paver, the apparatus facilitates positioning of a dump truck whereby the truck can dump aggregate directly into the paver's hopper. In addition, rugged anti-friction bearings may be employed to provide a strong pivot connection between the beam assembly and bracket capable of withstanding severe operating conditions.

To facilitate further snug coupling, the invention features novel contractible coupling arms, which are contracted by remotely-controlled rams supported on the arms. In addition, the invention contemplates a novel sequence of operation, whereby on coupling with a unit leading the vehicle, the rams on the arms contract the arms with this being followed by movement of the arms toward each other on the beam assembly which mounts the arms.

These and other objects and advantages attained by the invention will become more fully apparent as the description which follows is read in conjunction with the accompanying drawings, wherein:

FIG. 1 is a fragmentary plan view illustrating, in solid outline, coupling mechanism constructed according to the invention mounted on the forward end of the frame in a paver ,and in dashed outline, a rear wheel assembly in a dump truck positioned in front of the paver;

FIG. 2 is a fragmentary front elevation taken along the line 2—2 in FIG. 1;

FIG. 3 is a cross-sectional view, on a larger scale than FIGS. 1 and 2, taken along the line 3—3 in FIG. 2;

FIG. 4 is a cross-sectional view on the same scale as FIG. 3, taken along the line 4—4 in FIG. 1;

FIG. 5 is a side elevation, on the same scale as FIG. 2, taken along the line 5—5 in FIG. 2;

FIG. 6 is a simplified schematic diagram illustrating a hydraulic fluid supply constructed according to the invention; and FIG. 7 is an enlarged cross-sectional view illustrating the internal construction of a sequencing valve means forming part of the supply of FIG. 6.

Turning now to the drawings, and referring first of all to FIG. 1, indicated generally at 10 is the front part of a paver, such also being referred to herein as a vehicle, such as may be employed to spread and smooth aggregate over an area being paved. The paver is of conventional construction, and includes the usual frame, forward portions of which are indicated at 12, such frame supporting a hopper (not shown) adapted to receive aggregate discharged from the dump body of a dump truck. The paver may be what is referred to in the construction industry as a self-propelled paver, and includes means (not shown) for moving it under its own power over the ground. During use of the paver, the unit which leads the paver is the usual dump truck, one set of dual wheels for such a dump truck being illustrated in dashed outline at 14. When the dump body of such dump truck is raised, any aggregate contained therein is caused to cascade downwardly from the dump body into the hopper (not shown) of the paver, whence such material is spread over the ground. In such an organization of a paver behind a dump truck, it is desirable snugly to couple the two units together since this insures that the hopper of the paver will be in proper position to receive aggregate from the dump truck, and enables the forward progress of the paver and dump truck to be under the control of the operator of the paver with the truck not tending to roll away from the paver such as might otherwise occur on traveling down an incline.

The coupling mechanism contemplated is effective snugly to couple the paver and dump truck together in the manner required, is readily actuated to couple onto the dump truck, and to release the dump truck after it has dumped its load. It further permits a limited amount of relative swinging and side-to-side movement of the paver and dump truck, required if the two units are to move properly over the ground when coupled together.

Describing now in more detail the coupling mechanism contemplated, located forwardly of the paver frame and extending transversely of the longitudinal axis of the paver (such axis being the axis of the paver which extends in the direction of its travel during the paving operation) is an elongated, substantially horizontal beam assembly 16. As best shown in FIGS. 1 and 4, such may comprise front and rear beam sections 18, 20, respectively, joined together as by fasteners 22 distributed along the length of the beam assembly. The beam assembly is hollow, enabling the mounting within the beam assembly and adjacent its opposite ends, of a pair of elongated, hollow extension members 24, 26. The interior of the beam assembly is so shaped as to provide for guided sliding movement of the extension members along the axis of the beam assembly.

Fixedly joined to the front of the paver frame and also extending transversely of the longitudinal axis of the paver is guide structure indicated generally at 28, specifically comprising a pair of vertically spaced, elongated bars 30, 32. These are spaced a short distance forwardly of the paver frame, by a pair of laterally spaced plates 34, 36. Shown fastening the bars in place to the frame are fasteners such as fasteners 38. The bars form a horizontally extending track at the forward end of the paver frame, with upper and lower rail portions in the track.

Slidably mounted on the guide structure for movement laterally of the paver is a bracket 40. This bracket includes upper and lower legs 39, 41 which straddle a midregion of the beam assembly. Portions 40a, 40b of the bracket at rearward extremities of these legs embrace and are slidable on bars 30, 32 in regions of these bars located between plates 34, 36. The legs of the bracket are joined by expanse 40c located at the forward part of the bracket and an expanse 40d located immediately forwardly of bars 30, 32.

According to the invention a pivot means is provided pivotally joining a midregion of the beam assembly to the bracket, accommodating pivoting of the beam assembly relative to the bracket about an upright axis. In the embodiment of the invention illustrated, such pivot means comprises an anti-friction bearing or bearing assembly 42 interposed between the upper surface of the beam assembly and the upper bracket leg, and a lower anti-friction bearing or bearing assembly 44 interposed between the lower surface of the beam assembly and the lower bracket leg. Because the bearing assemblies are located above and below the beam assembly, bearing assemblies of requisite size to withstand the loads involved can be employed without such interfering with a close spacing of the forward part of the beam assembly to bars 30, 32.

On the beam assembly swinging about the vertical axis provided by bearings 42, 44, one of its ends will tend to swing toward bars 30, 32. Limiting swinging movement are pads 45a, 45b mounted on top of the beam assembly on opposite sides of bracket 40. It should be understood, and referring to FIG. 1, that if bracket 40 is shifted to the right to the limit position, where it strikes plate 36, and the beam assembly is swung in a clockwise direction, pad 45a will strike bar 30 with portions of the beam assembly outwardly from the pad moving into the space between bars 30, 32. The use of spaced bars, in other words, provides the necessary sliding movement in the bracket, while affording swinging of end portions of the beam assembly between the bars. Thus, the desired swinging movement is permitted while retaining a relatively compact overall organization.

Referring to FIG. 2, extension members 24, 26 are extended and retracted by a pair of hydraulic rams or hydraulically operated motor means, 46, 48 disposed within the interior of the beam assembly. Ram 46 has its cylinder 46a suitably anchored to the beam assembly and the rod 46b of the ram is connected to the inner extremity of member 24 through a mounting part 49. Similarly, the cylinder 48a of ram 48 is connected to the beam assembly, and its rod 48b is connected through a mounting part 53 to the inner end of member 26. With such an organization, and on the extension of the rams, the extension members are slid outwardly in the beam assembly, and conversely, on contraction of the rams, the extension members are withdrawn inwardly.

With the casing type of construction selected for the beam assembly, and with the extension members slidable directly on the interior of the casing, the casing operates to keep the parts inside the beam assembly free of dirt. If desired, shoes such as those shown at 27 in FIGS. 1 and 2 may be provided which wipe against the outside surfaces of an extension member where such projects outside the beam assembly to clean the extension member on such being retracted.

Mounted on the outer end of each extension member is a coupling arm, such as that shown at 58 for extension member 26. The coupling arm comprises an inner section 58a having a sleeve 57 joined to it, which is journaled on journal portion 56a of an adapter 56 which is joined to the outer extremity of extension member 26. Telescopically received within rear section 58a of the arm is a forward section 58b. Relative sliding movement is provided between the two sections, enabling the arm to be contracted from the condition it has in FIG. 5, with movement of the forward section backwardly into the rear section.

A roller 70 is journaled on the forward end of the arm in a sleeve 72 which is joined to the forward end of forward section 58b. Coupling with the rear wheels of a dump truck is established by moving the roller 70 within the confines of the annular rim of the outer wheel in such rear wheel assembly, i.e., by engaging the wheel assembly through its side.

Suitably secured within the confines of forward arm section 58b is a block 68. Another block 62 is joined to the interior of rear section 58a. Interposed between these two blocks is a ram 74 with the cylinder portion 74a thereof suitably anchored to block 68 and the rod portion 74b thereof suitably anchored to block 62. The ram is a single-acting ram, and on contracting of the ram the forward arm section is withdrawn into the rear arm section 58a to contract the coupling arm.

A roller 74 is journaled on cylinder 74a of the ram and as can be seen in FIG. 1, on the inner side of the coupling arm the roller protrudes slightly beyond the innermost portions of the coupling arm. This roller is utilized to engage the side wall of the outermost tire of the dual wheels which support one side of the dump truck and provide rolling contact with this side wall with the coupling arm shifted laterally inwardly to place its roller 70 within the rim of the outermost tire. A spring 78 interposed between block 62 and cylinder 74a of the ram tends to cause extension of ram 74. This spring serves to extend the coupling arm on fluid being allowed to escape from ram 74.

An element 67 fastened to block 62 with detent 67a extending into notch 69 of journal portion 56a limits up and down swinging of the coupling arm on the journal portion.

Referring again to FIGS. 1 and 2, indicated at 80, 82 are bump rolls journaled on brackets 84, 86. These brackets may be joined by suitable means, as by welding, to front section 18 of the beam assembly. A similar set of bump rolls are provided adjacent the opposite end of the beam assemblies, but these have been omitted from the drawings for the reason of simplicity. With the paver coupled to a dump truck, these bump rolls ride on the rear surfaces of the tires in the rear wheel assemblies of the truck. The bump rolls thus constitute wheel engaging means adjacent opposite ends of the beam assembly provided for making contact with the peripheries of the rear wheel assemblies of a truck or towing vehicle.

Referring now to FIG. 6, in this figure a supply 88 is illustrated for supplying fluid under pressure to the rams discussed mounted within the beam assembly and mounted within the contractible coupling arms. Describing the supply in more detail, such includes a conventional pressure-compensated pump 90 powered by a motor (not shown) through a belt 92. As is conventional with pressure-compensated pumps, with running of the pump, the pump is operable to deliver fluid up to a certain maximum pressure to line 102 which connects with the discharge side of the pump. Fluid is supplied to the pump from a reservoir 94 through a feed line or conduit 100. On the pressure of fluid in line 102 reaching a certain level, which is the maximum output pressure of the pump, the pump compensates for such level of pressure having been reached and performs essentially only such work in continuing to pump pressure fluid as is necessary to maintain the pressure at such maximum pressure in line 102.

A solenoid-operated control valve 96, ganged to solenoids 97, 98, controls the flow of fluid from pump discharge line or conduit 102 through lines or conduits 104, 106, 108 connected to the valve. With the valve in a neutral position, oil circulates through the valve from line 102 to line 104, and back to the reservoir. With energizing of solenoid 97 and adjustment of the valve to another position, fluid flows from line 102 into line 106 whereby pressure fluid is introduced into the rod ends of cylinders 46a, 48a of rams 46, 48. Line 108 is connected to line 102, providing for the exhaust of fluid from the butt ends of these ram cylinders. With this adjustment, therefore, pressure fluid is operable to produce contraction of the rams. With energizing of solenoid 98, pressure fluid flows from line 102 to line 108 and to the butt ends of these cylinders, and pressure fluid is allowed to exhaust from the rod ends of these cylinders through line 106 to line 104.

As contemplated herein, the supply for the various rams includes novel sequencing means which is operable, with the coupling arms spread apart and fully extended, to produce a sequence of operation on subsequent actuation of the rams, whereby the coupling arms are first moved toward each other by contraction of rams 46, 48, with the rams in the coupling arms then being actuated to contract the arms whereby the paver is drawn snugly against the rear wheels of the dump truck to which the paver is coupled. This sequencing means in the embodiment of the invention herein contemplated, comprises a sequencing valve such as the one illustrated in FIG. 7, which controls the flow of fluid to the ram in a coupling arm.

Referring to FIG. 7, the sequencing valve includes a valve body 128 with a passage 130 extending inwardly from one end of the valve body. A spool member 132 is biased to the left in FIG. 7 by a spring 134, to close off a passage 136 in valve seat 138. With valve member 132 backed off from the valve seat, fluid flow may take place from passage 136 through a passage 140 into passage 142. A check valve assembly is shown at 144 including a ball 146 and spring 148. The check valve assembly accommodates flow of fluid from passage 142 and through a passage 150 into passage 130 with movement of the ball to the left to compress the spring whereby the check valve is opened. Reverse flow of fluid, however, from passage 130 into passage 142 is prevented by the check valve assembly.

Explaining the operation of the sequence valve, the flow of fluid from passage 130 into passage 142 is prevented until such time as the pressure of fluid reaches such level sufficient, through acting upon the area of spool member 132 which is exposed through passage 136, to shift the valve spool away from the passage. Once such spool has been moved off passage 136, flow through the valve is accommodated into passage 140, with such then flowing out of the valve body through passage 142. With the valve spool backed away from passage 136, an increased area of the valve spool is exposed to fluid under pressure, meaning that fluid at a lesser pressure will maintain the valve spool retracted from passage 136 than was necessary initially to open the passage. With passage 130 connected to exhaust, and a pressure fluid in passage 142, fluid may flow in the opposite direction through the valve body with opening of the check valve assembly 144, and with such fluid flowing from passage 142 through passage 150 into passage 130.

Referring again to FIG. 6, each of the rams 46, 48 within the beam assembly is provided with a rod which has a passage such as that shown at 114 extending along the length of the rod. The interior of each ram cylinder adjacent the rod end of the ram cylinder, communicates with such internal passage, as by way of passage means 116 provided in piston structure of the rod. The ram which is in each coupling arm, for instance ram 74 shown in FIG. 6, is similarly constructed with the rod of the ram having a longitudinally extending passage, such as that shown at 124, which communicates with the interior of the ram cylinder adjacent the rod end of the ram through passage structure such as that shown at 126 in the piston of the ram. Interconnecting passage 114 of a ram in the beam assembly with passage 124 of a ram in one of the coupling arms is a line or conduit 160 which connects with sequencing valve 120, more specifically, passage 130 of the valve, and a line or conduit 162, which also connects with valve 120, more specifically, passage 142 of the valve.

Explaining generally how the supply operates when the coupling mechanism is employed to attach the paver to a dump truck, to move the opposed coupling arms away from each other on the beam assembly, valve 96 is adjusted to admit fluid under pressure through line 108 to the butt ends of the cylinders of rams 46, 48, and to permit the exhaust of fluid from the rod ends of the ram cylinders through line 106. This results in rams 46, 48 extending to space the coupling arms the maximum distance apart permitted by the construction. If desired, flexible chains or other means may be extended between the coupling arms and the paver, on either side of the paver, which become tensed on the coupling arms being spread their maximum distance apart, and which, when tensed, operate to cause the beam assembly to shift on the guide structure whereby it occupies a centered position with respect to the longitudinal axis of the paver. These chains or similar devices have not been shown in the drawings, but reference is made to U.S. Pat. No. 3,275,342 for a fuller description of such an organization.

With the rod ends of the ram cylinders of rams 46, 48 connected to exhaust, conduit 160 for a coupling arm also connects with an exhaust, and the sequencing valve which is associated with each coupling arm then permits the exhaust of fluid from conduit 162 (through the check valve assembly earlier described). With each coupling arm biased to extend by a spring, such as spring 78, such extension takes place, with extension of ram 74 in the coupling arm accompanied by fluid exhausting from the ram through passage 124 and the sequencing valve.

To couple a dump truck to the front of the paver, the dump truck is backed up between the coupling arms with the coupling arms in their laterally spread-apart position. With the rear wheels of the dump truck adjacent the beam assembly and to produce coupling of the paver to the dump truck, the solenoid-operated valve 96 is adjusted to admit pressure fluid through line 106 and connect line 108 to exhaust. With such an adjustment, pressure fluid is admitted to the rod ends of the cylinders of rams 46, 48 tending to cause contraction of these rams. Initially fluid flow is prevented out through the rods by reason of the sequencing valves occupying the general position shown in FIG. 7.

Upon contraction of rams 46, 48, the coupling arms are drawn toward each other until finally they come into engagement with the opposite sides of the rear wheel assemblies of the dump truck. When this occurs and further movement is restricted, pressure builds up within the rod ends of the cylinders of rams 46, 48, to produce an increase in pressure in the fluid contained within the passage extending along the rods of these rams to increase the fluid pressure in passage 130 of the sequencing valve. Ultimately, a pressure is reached which causes the sequencing valves to open, whereby fluid flow takes place through the valves and into lines 162 and the rams which are mounted within the coupling arms. When such occurs, the rams are contracted to cause contraction of the arms and drawings of rollers 70 against the inside of the rims of the wheel assemblies.

Once coupled, the operator of the paver, and assuming that it is a self-propelled paver, can completely control maneuvering of the truck, other than its steering, through operation of the motor which runs the paver. The dump truck is drawn up against the paver to prevent it from rolling away from the paver, particularly troublesome on a downhill incline, the braking effect of a self-propelled paver being sufficient to brake both the paver and the dump truck coupled to it. With the units therefore assembled, there is no need for a dump truck operator to operate the truck brakes, which could impede forward movement of the paver.

It will further be noted that the coupling mechanism accommodates certain relative movement between the unit coupled and the paver or trailing vehicle. Relative side-to-side shifting of the two units is accommodated with the bracket sliding along the guide structure described. The top and bottom bars in the guide structure present enlarged wear surfaces for the bracket which slides therealong. The spaced bars also provide a good mounting for the bracket, inhibiting twisting of the bracket. With the pivot means for the beam assembly located forwardly from the guide structure with respect to the trailing vehicle or paver, there is no angular shifting of the guide path provided by the guide structure with relative pivotal movement occurring. This is an important element in removing certain restrictions as to the size of the guide structure, and its spacing with respect to the vehicle frame. Note also that the organization contemplated permits the pivot means for the beam assembly to comprise spaced pivot connections, with one disposed above and one disposed below the beam assembly. This affords the opportunity to utilize bearing assemblies of requisite size to withstand the various stresses involved, without such introducing increased mass and clearance problems.

While a particular embodiment of the invention has been described herein, it is obvious that certain changes may be made in the organization and in the particular parts employed without departing from the invention. It is desired, therefore, to cover all such variations and modifications of the invention as would be apparent to one skilled in the art and that come within the scope of the appended claims.

It is claimed and desired to secure by Letters Patent:

1. Mechanism for coupling a vehicle having a frame to a unit leading the vehicle comprising elongated guide structure adapted to be fixedly joined to the front of the vehicle frame and extending transversely of the longitudinal axis of the vehicle, a movable bracket mounted on said guide structure for movement along the length of said guide structure, an elongated beam assembly disposed adjacent and substantially paralleling said guide structure and having members at opposite ends of the beam assembly which are extensible from the beam assembly, said members supporting at opposite ends of the beam assembly a pair of forwardly projecting coupling arms employable in coupling the vehicle with the unit leading the vehicle, said bracket having upper and lower legs straddling a midregion of the beam assembly, and pivot means pivotally joining said beam assembly and said bracket accommodating pivoting of the beam assembly relative to said bracket about an upright axis, said pivot means including a pivot connection between said upper leg of the bracket and an upper portion of said beam assembly and another pivot connection between the lower leg of the bracket and a lower portion of said beam assembly.

2. In combination with a vehicle having a frame, an elongated substantially horizontal beam assembly extending transversely of the forward end of the vehicle frame, elongated guide structure fixedly joined to the front of the vehicle frame and substantially paralleling said beam assembly, said guide structure including means forming a horizontally extending track at the forward end of said vehicle frame with upper and lower rail portions in said track, a movable bracket mounted on said guide structure for movement along the length of the guide structure, said bracket including portions embracing and slidable on said upper and lower rail portions of said track, and pivot means pivotally joining a midregion of said beam assembly and said bracket accommodating pivoting of the beam assembly relative to said bracket about an upright axis, said beam assembly mounting at opposite ends a pair of forwardly projecting coupling arms employable in coupling the vehicle with a unit leading the vehicle.

3. The combination of claim 2, wherein said pivot means comprises first and second bearing assemblies disposed above and below said beam assembly, each bearing assembly producing an operative pivot connection between the beam assembly and said bracket.

4. The combination of claim 2, wherein said beam assembly has wheel engaging means adjacent its ends for making contact with the peripheries of the rear wheel assemblies of a truck, said coupling arms are contractible and extend forwardly of said wheel engaging means, said coupling arms have means at their forward extremities for engaging the rear wheel assemblies of a truck through the sides of the wheel assemblies and which further comprises remotely cotrolled, power-operated means operatively connected to each of the arms for contracting the same.

5. Mechanism for coupling a vehicle having a frame to a truck leading the vehicle comprising an elontaged beam asembly adapted to be mounted in a position extending transversely of the forward end of the vehicle frame, said beam assembly having wheel engaging means adjacent its ends for making contact with the peripheries of the rear wheel assemblies of the truck, a pair of opposed, contractible coupling arms extending forwardly of said beam assembly, supported adjacent opposite ends of the beam assembly for movement toward and away from one another, said coupling arms extending forwardly of the wheel engaging means and having means at their forward extremities for making engagement with the rear wheel assemblies of the truck through the sides of the wheel assemblies, and remotely controlled power-operated means operatively connected to each of said arms for contracting the same.

6. The mechanism of claim 5, wherein each coupling arm comprises a pair of relatively movable arm parts, and said power-operated means comprises a fluid-operated ram operatively interposed between the parts in the arm operable to draw such parts together to contract the arm.

7. The apparatus of claim 6 which further comprises biasing means for each arm operatively interposed between the parts in the arm urging such parts away from one another.

8. The apparatus of claim 6 which further comprises fluid-operated motor means for moving said arms toward and away from one another, and a supply for supplying pressure fluid to said rams and to said motor means, said supply including sequencing means operable to produce a sequence of operation wherein said motor means first moves said arms toward one another and said rams then contract said arms.

9. The apparatus of claim 8, wherein said supply further includes first conduit means for admitting pressure fluid to said rams to contract said arms, and second conduit means for admitting pressure fluid to said rams to contract said arms, and said sequencing means comprises a valve operatively connected to said first and second conduit means, said valve including a valve spool biased to one position blocking the admission of pressure fluid to said second conduit means, and responsive to the pressure of fluid in said first conduit means reaching a certain level to shift to another position admitting pressure fluid to said second conduit means.

References Cited

UNITED STATES PATENTS

| | | | |
|---|---|---|---|
| 2,910,307 | 10/1959 | Jennings | 280—460 |
| 3,138,392 | 6/1964 | Holland | 280—460 X |
| 3,275,342 | 9/1966 | Layton | 280—460 |
| 3,295,866 | 1/1967 | Standfuss | 280—460 |
| 3,304,101 | 2/1967 | Layton | 280—460 |

FOREIGN PATENTS 602,487  5/1948  Great Britain.

LEO FRIAGLIA, Primary Examiner

U.S. Cl. X.R.

280—481